United States Patent [19]
Rogers

[11] Patent Number: 4,617,812
[45] Date of Patent: Oct. 21, 1986

[54] AUTOMOBILE DOOR LOCKING SYSTEMS

[75] Inventor: Peter G. Rogers, Redditch, England

[73] Assignee: Security & Auto Electrical Designs Ltd., Redditch, England

[21] Appl. No.: 666,745

[22] Filed: Oct. 31, 1984

[30] Foreign Application Priority Data

Nov. 10, 1983 [GB] United Kingdom ................. 8330006

[51] Int. Cl.[4] .............................................. B60R 25/02
[52] U.S. Cl. ......................................... 70/218; 70/280
[58] Field of Search ................. 70/218, 219, 220, 221, 70/222, 223, 237, 280, 281, 282; 16/110 R, 121; 292/336.3

[56] References Cited

U.S. PATENT DOCUMENTS

| | | | |
|---|---|---|---|
| 1,970,807 | 8/1934 | Lovell | 70/218 |
| 3,748,878 | 7/1973 | Balzono | 70/218 |
| 4,019,355 | 4/1977 | Germanton | 70/220 |
| 4,429,556 | 2/1984 | Kambie | 70/218 |

*Primary Examiner*—Robert L. Wolfe
*Attorney, Agent, or Firm*—James C. Wray

[57] ABSTRACT

An automobile door locking system comprises mechanical means for connecting the door handle to the door latch, said mechanical means comprising separable parts, and electrically operated means for connecting said separable parts together whereby the latch can be released by operation of the door handle and for disconnecting said parts whereupon the latch can no longer be operated by actuation of the handle.

9 Claims, 9 Drawing Figures

AUTOMOBILE DOOR LOCKING SYSTEMS

BACKGROUND TO THE INVENTION

This invention relates to automobile door locking systems especially applicable to systems of the kind in which all doors can be locked simultaneously by a single locking operation.

STATEMENT OF PRIOR ART

In known systems each door has a latch operated from inside and outside by the door handles, and a locking mechanism which can be operated by the individual press down knobs or by a common switch operating all four locking mechanisms.

OBJECT OF THE INVENTION

The main object of the present invention is to provide a simultaneous locking system which is less complicated and occupies less space than presently used systems and which can easily and quickly be mounted on the doors and will provide additional safety to enable occupants to get out of a vehicle involved in an accident.

SUMMARY OF THE INVENTION

According to the present invention the system comprising mechanical means for connecting the door handle to the door latch, said mechanical means comprising separable parts, and electrically operated means for connecting said separable parts together whereby the latch can be released by operation of the door handle and for disconnecting said parts whereupon the latch can no longer be operated by actuation of the handle.

In the known central locking systems the central control actuates the door locking mechanisms whereas in the present invention the central control or external control (i.e. the electrically operated means) does not actuate the locking mechanisms but controls connections between the door handles and the door latches.

Therefore if for example a vehicle is involved in a road accident and the driver's lock control becomes inoperable it will still be possible to unlock the other doors and enable the occupants to escape.

The electrically operated means may be in the form (for each door) of a reversible electric motor coupled in a circuit with a capacitor and a resistor, the motor spindle having a pinion driving a rack which actuates a pin engageable in apertures in the separable parts, the four motors being controlled by a common switch.

A key operated cylinder switch resiliently biassed to a neutral position may also be provided on the driver's door and on the front passenger's door.

The normal press down buttons will be removed from the locking systems and may be replaced by an electromechanical indicator to indicate the state of the system, locked or unlocked when the separable parts are connected to or disconnected from each other.

In the case of partial or full power failure of the vehicle electrical system or malfunction of any electrical or mechanical part provisions may be made within the system to either electrically or mechanically override a locked condition such that entry can still be achieved.

BRIEF DESCRIPTION OF DRAWINGS

The invention will be further described by way of example with reference to the accompanying diagrammatic drawings wherein.

DESCRIPTION OF PREFERRED EMBODIMENTS

Figure 1:
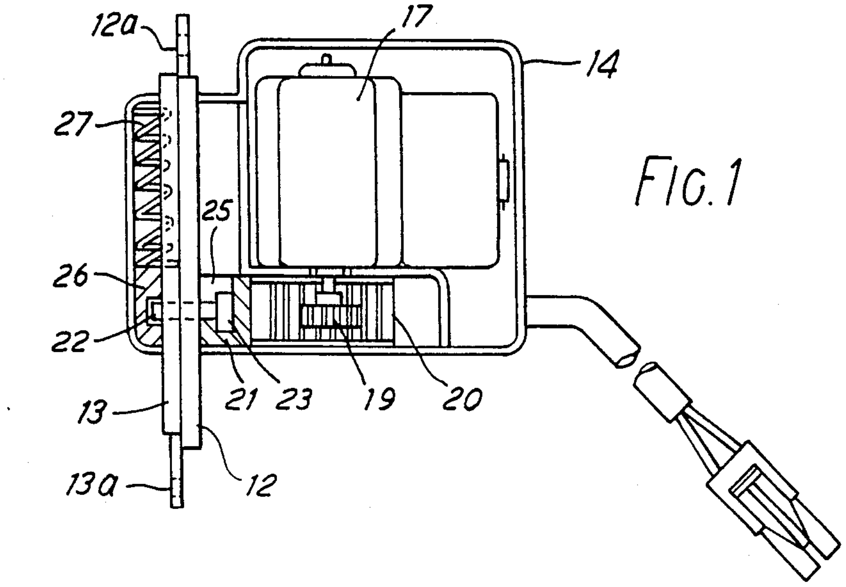
FIG. 1 is a sectional view of an electrically operated means for connecting and disconnecting separable parts to be inserted between a door handle and the door latch.
Figure 2:
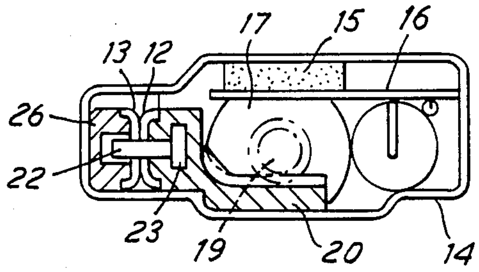
FIG. 2 is a sectional view thereof on the plane A—A on FIG. 3.
Figure 3:
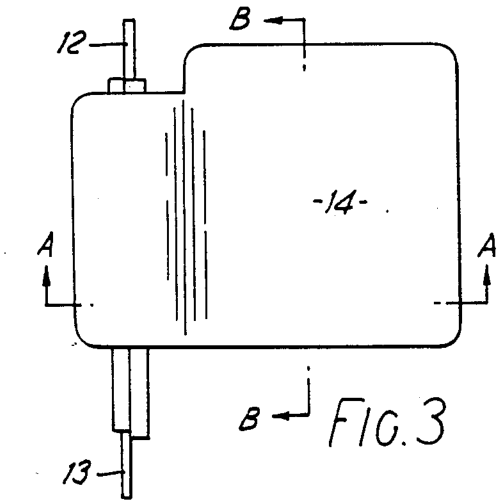
FIG. 3 is a plan view thereof.
Figure 4:
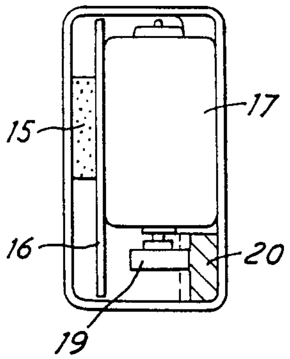
FIG. 4 is a sectional view thereof on the plane B—B on FIG. 3.

Referring first to FIGS. 1 to 4 two flat rods 12,13 are arranged slidably one upon the other in a guideway formed in a housing 14. The rod 12 is to be connected at 12A to the door handle and the rod 13 is to be connected at 13A to the door latch. A printed circuit board 16 is fixed in the housing 14 and a small reversible electric motor 17 is fixed on the board 16 together with a capacitor and resistor, these being connected in series with the motor. A resilient pad 15 is inserted between the housing 14 and board 16. The motor spindle carries a pinion 19 which normally gears with a toothed rack 20 which carries a block 21 that has a T-shaped slot 25. A pin 22 is engageable in holes in the rods 12,13 to hold them together but can be disengaged by actuation of the rack. The pin has a head 23 movable transversely of its axis along the slot 25. The pin is also engageable in a guide 26 which is urged to a position in alignment with the apertures in the rods 12,13 by a spring 27.

Thus when the pin 22 is withdrawn from the holes in the flat rods 12,13 the movements of the handle cannot undo the door latch. When the pin is inserted through the holes in the flat rods 12,13 the door handle is operatively connected with the latch and movement of the rods 12,13 is possible by the sliding of the pin 22 along the guide way 25.

Figure 5:
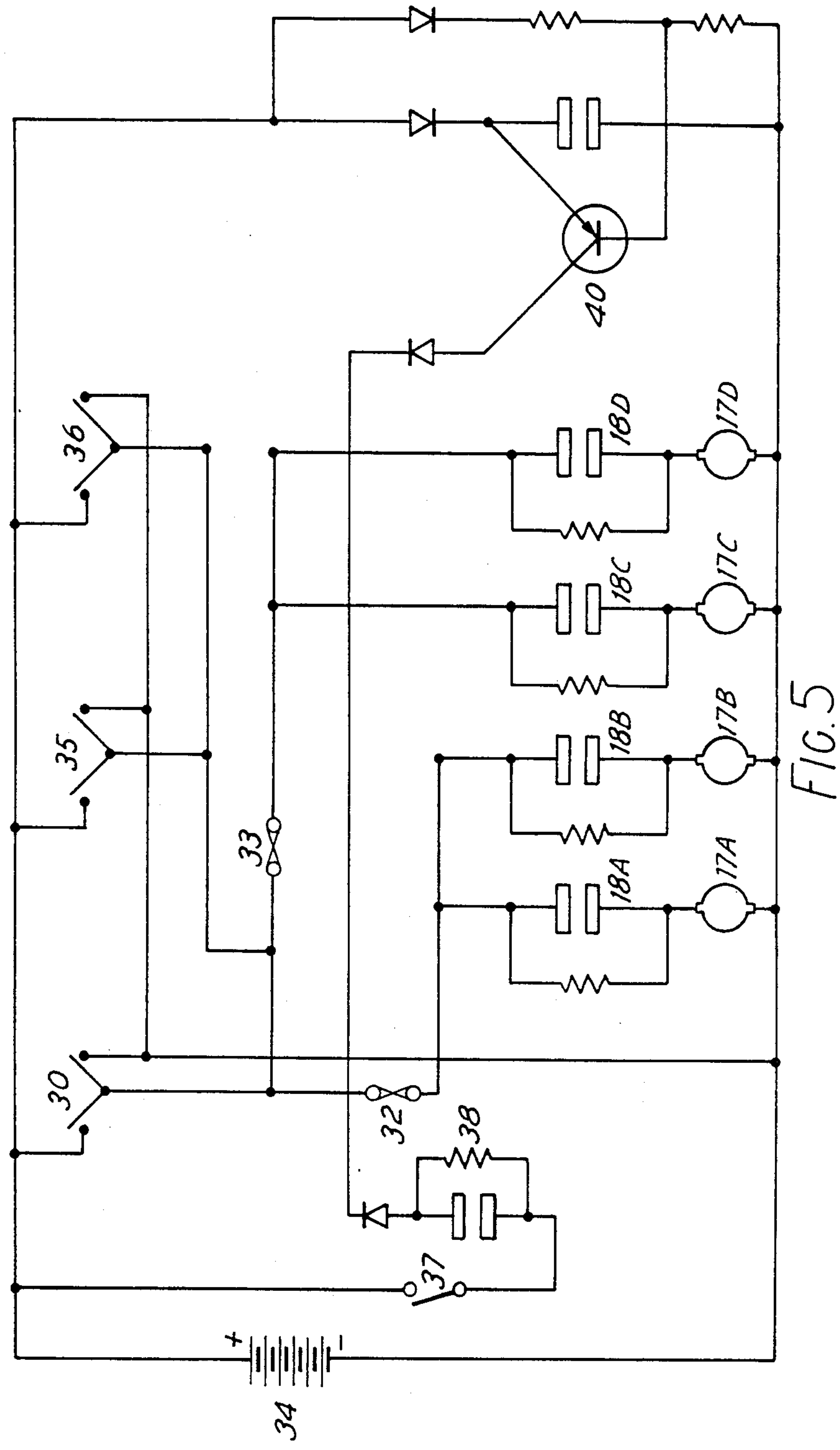
FIG. 5 is a circuit diagram of the complete system.

In FIG. 5 the four motors are shown at 17A, 17B, 17C, 17D and the capacitor-resistor circuit at 18A, 18B, 18C, 18D. The motors and circuits are connected to a dashboard control switch 30 and to switches 35,36 on the door external key locks. The circuits 18A, 18B are in the driver's door and rear of driver's door respectively and include a fuse 32. The circuits 18C, 18D are in the front passenger's door and rear passenger's door respectively and include a separate fuse 33. The vehicle battery 34 is connected to the motors and switches. The driver's door lock switch 35 and the passenger's door lock switch 36 are connected across one side of the main switch 30. A door pillar switch 37 and an outlock prevention device 38 are connected between the battery and a power failure device 40, the latter including a transistor, diodes and capacitance arranged so that if the battery current fails the transistor-capacitor, upon closing of switch 37 (inside the car), will send an impulse to the motor 17A to unlock the driver's door.

Figure 6:
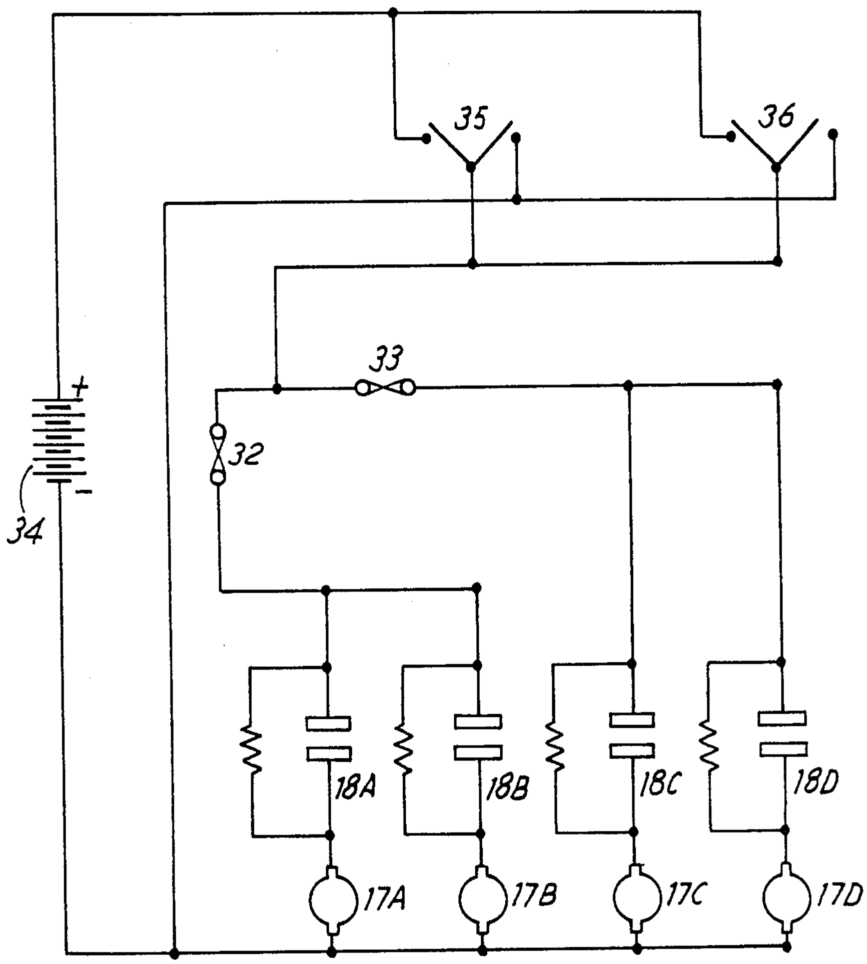
FIG. 6 is a circuit diagram of a simpler form for the system.

FIG. 6 is similar to FIG. 5 but omits internal control switch 30 for central locking and therefore requires no outlock prevention and omits other parts such as 37,38,40. The switches 35,36 are connected direct to the battery 34.

All the motors are operated in one direction by an impulse derived from discharge of the capacitors and in the other direction by a direct impulse from the battery.

Figure 7:
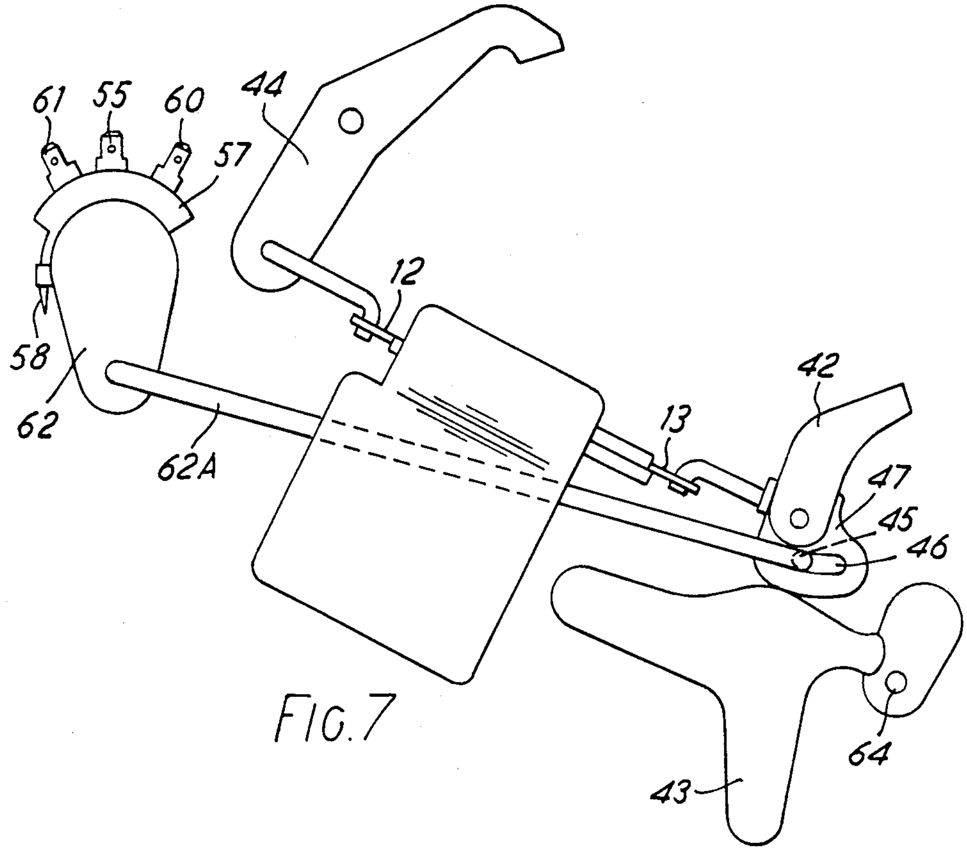
FIG. 7 is a view of the connection between the door handle and the latch.

FIG. 7 shows one method of applying the invention to an existing door latch. The unlatch lever of the latch mechanism is shown at 42 and the door locking mechanism at 43. The rods 12,13 are connected respectively to the outer door handle lever 44 to the lever 42. A door keyswitch lever 62 on the driver's door is connected by a rod 62A to a pin 45 engaged in a slot 46 in a sleeve 47 which is attached to the lever 42. The rod 62A is normally connected to the locking mechanism but in the present construction the rod 62A is not so connected but is connected to the pin 45. The rod 62A enables the latch to be opened from outside the door in case of electrical power failure.

Figure 8:
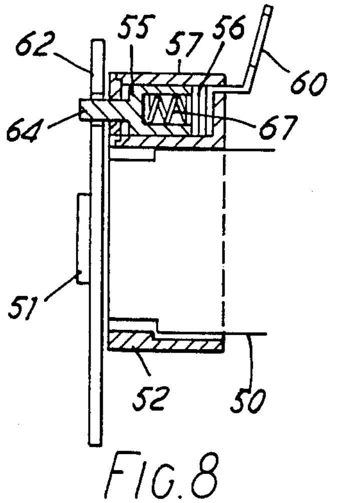
FIG. 8 is a sectional view of a door lock operating biassed off switch.
Figure 9:
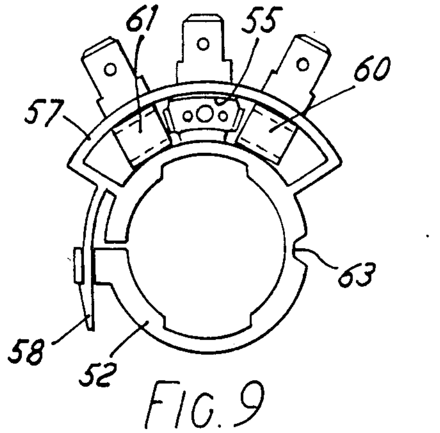
FIG. 9 is an end view thereof.

FIGS. 8 and 9 show a door keyhole housing 50 and usual barrel 51 containing the key tumblers. A housing 52 is mounted on the keyhole housing 50. The housing 52 is moulded from a synthetic plastics material so as to be flexible about a position 63 on its circumference so that it can be opened and placed around the housing 50 and can be locked in this position by a catch 58. The housing 52 carries a hollow extension 57 which contains a movable switch contact member 55 and two electrical contacts 60, 61. Springs (not shown) urge the movable member 55 circumferentially to a neutral "off" position. The movable member 55 has a projection 64 which extends through a slot in a steel plate 62 which is keyed to the barrel 51. A spring 67 urges a contact 56 axially towards the contacts 60,61.

The central locking system is made up of the following parts:

1. A dashboard mounted, switch operated, control box.
2. An electric motor driven mechanism situated in each vehicle door.
3. Key operated cylinder switches on driver's door and front passenger's door.
4. An electrical wiring loom connecting the control box with the individual door mechanism units and key cylinder switches.

The control box also may contain an electronic assembly which signals the driver's door in event of accident and a subsequent total power failure to an unlocked condition. Also there may be included a shock switch which gives signal to all door mechanisms, that are locked, to unlock, when power is still available in the event of an impact to, or by the vehicle, in excess of six and a quarter G.

The main features of the system of FIG. 5 may be summarized as follows:

1. To lock from inside all outer handles such that they are rendered inoperative. This is achieved via the dashboard mounted switch 30.
2. To lock from outside all outer handles such that are rendered inoperative. This is achieved via either of the key cylinder switches 35,36 mounted on the rear of each door cylinder.
3. Should any unit fail electrically or mechanically in a locked mode the driver's door can still be opened from outside via the key override lever 62A operating directly the latch mechanism.
4. Children's safety is unaffected as this can be incorporated in the door latch at both rear doors and is a separate mechanical operation.

We claim:

1. An automobile door locking system comprising mechanical means for connecting a door handle of a door to a door latch of the door, said mechanical means comprising separable parts, and electrically operated means for connecting said separable parts together, said electrically operated means including a locking member movable into engagement with said parts to cause them to move as a unit in a common direction whereby the latch can be released by operation of the door handle and movable out of engagement with said parts whereupon said parts are disconnected from each other whereupon the latch can no longer be operated by actuation of the handle.

2. A system according to claim 1, wherein the electrically operated means is in the form of a reversible electric motor having a motor spindle and coupled in a circuit with a capacitor and a resistor, the motor spindle having a pinion driving a rack which carries said electrically operated means in the form of a pin to move it into and out of holes in said separable parts, said pin being resiliently movable transversely to the direction of movement of the rack.

3. A system according to claim 2, comprising a housing containing said motor, rack and pin, said separable parts being in the form of two flat rods lying upon each other and extending out of the housing and being slidable therein transversely to the axis of said pin.

4. A system according to claim 2, having four said mechanical means and two or four said electrically operated means, one for each door and two switches connected in an electrical circuit with said electrical means and arranged for connection to a motor-car battery, each switch serving to effect operation of all two or four said electrically operated means; said switches having a movable contact having a position in which it is resiliently held in an off position and engageable with either of two other contacts for locking and unlocking two or four door latches, and means for mounting said switches operating on said two or four door latches.

5. A system according to claim 4 when applied to a motor car having a further switch connected with an outlock device, which comprises a capacitor and resistor connected in this circuit such that on closing the switch an inpulse is sent to the motor to unlock the driver's door of the motor car.

6. A system according to claim 4, when applied to a motor car, having a device connected with the system including a transistor, diodes, capacitor and resistors such that in the event of total power failure the capacitor discharges sending an impulse to the motor to unlock the drivers door of the motor car.

7. A system according to claim 4, wherein each said two switches are connected to the motors via a capacitor such that when in use the motors are operable in one direction by electrical impulse from an electrical source and in the other direction by impulse from discharge of the capacitors.

8. A system according to claim 1, wherein the door includes a door lock having a lock barrel and having a key switch lever attachable to the lock barrel of the door lock, a door locking lever, a door unlocking lever and a rod connecting the key switch lever by a lost motion device to an unlatch lever whereby the door lock can be unlocked from outside the door in case of electrical power failure.

9. An automobile having a plurality of doors, each door having a door handle and a door latch and an automobile door locking system comprising four housings separate from the latching devices; each housing containing (a) two slidable parts each having a hole therein, (b) a pin engageable in said holes to lock said parts together whereby they can slide as a unit, and (c) a reversible electric motor connected with said pin for driving it into and out of said holes; and an electric circuit including switch means whereby all of said motors can be operated simultaneously.

* * * * *